Nov. 24, 1925.

M. M. McINTYRE

VEHICLE SPRING

Filed Aug. 28, 1922

1,562,779

INVENTOR.

M. M. McIntyre
by B. M. Kent
Attorney

Patented Nov. 24, 1925.

1,562,779

UNITED STATES PATENT OFFICE.

MICHAEL M. McINTYRE, OF CLEVELAND, OHIO, ASSIGNOR, BY MESNE ASSIGNMENTS, TO THE EATON AXLE & SPRING COMPANY, OF CLEVELAND, OHIO, A CORPORATION OF OHIO.

VEHICLE SPRING.

Application filed August 28, 1922. Serial No. 584,604.

*To all whom it may concern:*

Be it known that I, MICHAEL M. McIN-TYRE, a citizen of the United States, and a resident of Cleveland, county of Cuyahoga, State of Ohio, have invented certain new and useful Improvements in Vehicle Springs, of which the following is a specification.

This invention relates to vehicle springs and more particularly to improvements in leaf springs. One of the objects of the invention is to overcome a difficulty that has been experienced in connection with leaf springs in which the ends of the leaves have been sheared to provide a taper or point. It has been found from experience with springs made up of leaves having pointed ends that, on account of the broad surfaces of the leaves being concave, the points or narrow ends have a tendency to gouge into the adjoining leaf, due to the flexing of the spring, and this gouging action, in time, so weakens the spring that breakage at this point results and in addition the springs produced an objectionable clicking noise.

A further object of the invention is to provide, in combination with the improvements just referred to, an efficient means for lubricating the spring leaves.

Other objects and the features of novelty will be apparent from the following description taken in connection with the accompanying drawing, of which:

Figure 1:
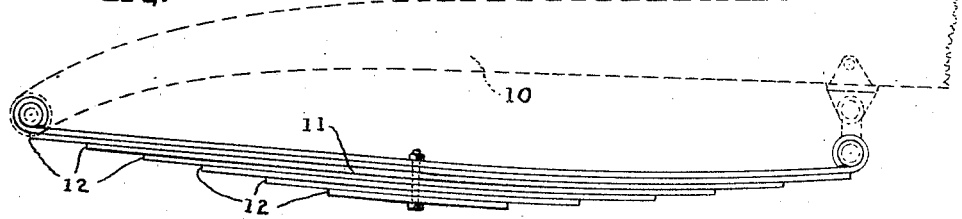
Figure 1 is a side elevation of a semi-elliptic spring of the type used on motor vehicles, the spring embodying my improvements.
Figure 2:
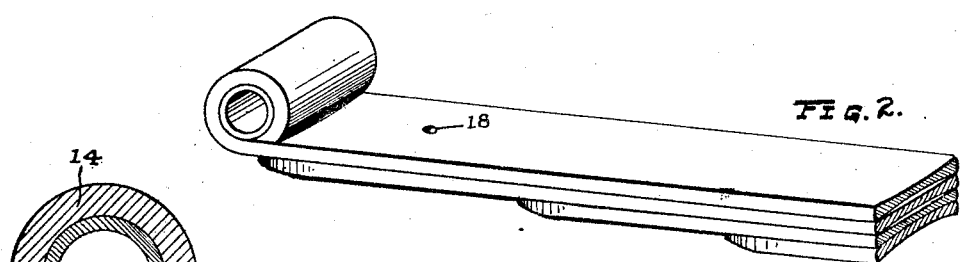
Fig. 2 is an enlarged perspective of one of the ends of the spring shown in Fig. 1.
Figure 5:
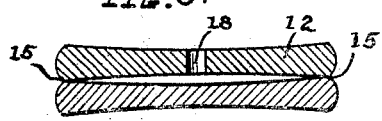
Fig. 5 is a transverse section on the line 5—5 of Fig. 3.
Figure 6:
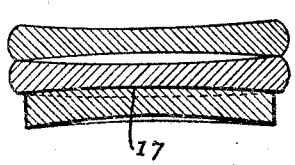
Fig. 6 is a transverse section on the line 6—6 of Fig. 3.

Referring to the drawings, 10 indicates a portion of the frame of a motor vehicle and 11 indicates, generally, a semi-elliptic spring. This spring is made up of superposed leaves of spring steel and the bars of steel, as they come from the rolling mill, have their broad surfaces slightly concaved, as is shown in Fig. 5. The concavity of these surfaces is considerably exaggerated in Figs. 5 and 6, for the purpose of more clearly illustrating the invention. As ordinarily constructed leaf springs are made up of several leaves with their ends in relatively stepped arrangement, as indicated at the points 12 in Fig. 1. The main leaf 13 of the spring is usually provided with an eye 14 and, on account of the concavities in the broad surfaces of the leaves, their adjoining faces are in contact only along the edges, as indicated at 15 in Fig. 5.

Figure 4:
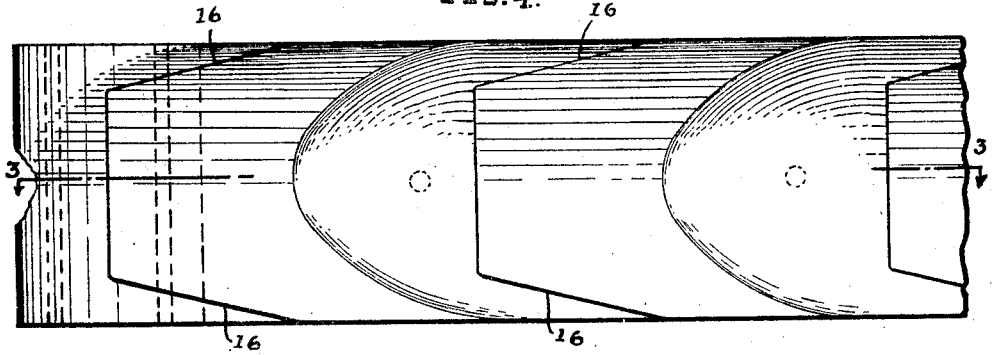
Fig. 4 is a botttom plan of the portion of the spring appearing in Fig. 3.

It is common practice, in leaf spring construction, to trim off the corners of the ends of the leaves, as indicated at 16 in Fig. 4, so as to provide a pointed or narrow end on the leaf and it has been found from experience that springs thus constructed with these pointed ends, in moving upon the surface of the adjoining leaf, when the spring flexes, tend to gouge or cut into the leaf and thus weaken it. I overcome this difficulty by deforming the end portion of the leaf so that, instead of presenting a concave surface to the adjoining leaf, it fits the concave surface of the latter, as is indicated at 17 in Fig. 6.

Figure 3:
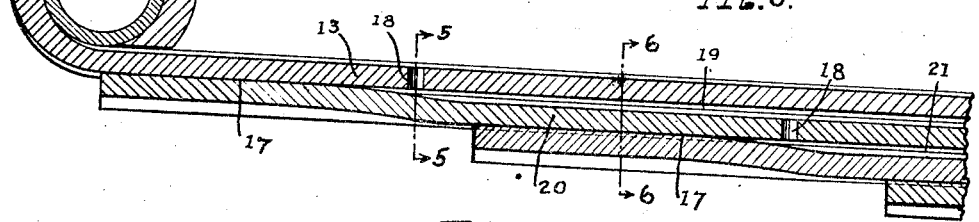
Fig. 3 is an enlarged longitudinal section on the line 3—3 of Fig. 4.

This deforming of the end of the leaf is also indicated in Figs. 3 and 4 and may be formed by suitable dies in a stamping press or by rolling the ends of the leaves in suitably formed rolls. The particular method of providing this deformation in the ends of the leaves is immaterial so long as the ends are made to conform to the concave surface of the adjoining leaf. In addition to deforming the leaves, for the purpose above specified, I prefer to provide each of the leaves with a small hole 18 on its longitudinal center line for the purpose of supplying lubricant to the spaces between the leaves. From Fig. 3 it will be observed that the holes 18 in the different leaves are staggered so that lubricant introduced through the hole in the main leaf 13 will traverse the space 19 and lubricate the abutting surfaces of the leaves 13 and 20 and a portion of the lubricant will flow through the opening 18 in the leaf 20 to the space 21 and thence to the spaces between the succeeding leaves. In this way the leaves will be thoroughly lubricated and the deformation of the ends of the leaves will serve to close the ends of the spaces between the leaves and thus exclude dirt to a large extent.

Having thus described my invention, what I claim is:

1. In leaf spring construction, a plurality of superposed leaves of similar cross-section and uniform thickness in the medial plane throughout their length having opposed concave sides the edge portions of which are in contact and having their ends in stepped arrangement, the end portion of one leaf being deformed to fit the concave surface of the adjoining leaf.

2. In leaf spring construction, a plurality of superposed leaves of similar cross-section and uniform thickness in the medial plane throughout their length having opposed concave sides the edge portions of which are in contact and having their ends in stepped arrangement, the end portion of one leaf being tapered in width and being deformed to fit the concave surface of the adjoining leaf.

3. In leaf spring construction, a plurality of superposed leaves with their ends in relatively stepped arrangement, the opposed surfaces of the leaves being concave, and the end portions of certain leaves being deformed to fit the concave surface of the adjoining leaf, and there being openings through the leaves inwardly of said deformed portions for supplying lubricant from one of the spaces between the leaves to another.

In testimony whereof I affix my signature.

MICHAEL M. McINTYRE.